(12) United States Patent
Ryan et al.

(10) Patent No.: US 9,027,937 B2
(45) Date of Patent: May 12, 2015

(54) ELECTRONICALLY ADJUSTABLE DAMPER AND SYSTEM

(71) Applicant: MSI Defense Solutions, LLC, Mooresville, NC (US)

(72) Inventors: Jeffrey S. Ryan, Mooresville, NC (US); David J. Holden, Davidson, NC (US); Jeffrey L. Peterson, Mooresville, NC (US); James M. Wyler, Charlotte, NC (US); Todd J. Holbert, Kernersville, NC (US); Andrew M. Wizorek, Davidson, NC (US)

(73) Assignee: MSI Defense Solutions, LLC, Mooresville, NC (US)

( * ) Notice: Subject to any disclaimer, the term of this patent is extended or adjusted under 35 U.S.C. 154(b) by 0 days.

(21) Appl. No.: 13/913,831

(22) Filed: Jun. 10, 2013

(65) Prior Publication Data

US 2013/0328277 A1    Dec. 12, 2013

Related U.S. Application Data (60) Provisional application No. 61/682,359, filed on Aug. 13, 2012, provisional application No. 61/657,234, filed on Jun. 8, 2012.

(51) Int. Cl.
*B60G 17/016* (2006.01)
*B60G 17/08* (2006.01)

(52) U.S. Cl.
CPC .............. *B60G 17/016* (2013.01); *B60G 17/08* (2013.01); *B60G 2500/10* (2013.01); *B60G 2600/202* (2013.01)

(58) Field of Classification Search
USPC .............. 280/5.5, 5.506, 5.507, 5.512, 5.514, 280/5.515; 701/37
See application file for complete search history.

(56) References Cited

U.S. PATENT DOCUMENTS

| | | | |
|---|---|---|---|
| 3,917,307 A | 11/1975 | Shoebridge | |
| 4,821,849 A | 4/1989 | Miller | |
| 5,133,574 A | 7/1992 | Yamaoka et al. | |
| 5,519,612 A | 5/1996 | Liubakka et al. | |
| 5,570,288 A | 10/1996 | Badenoch et al. | |

(Continued)

FOREIGN PATENT DOCUMENTS

| | | |
|---|---|---|
| EP | 1167093 B1 | 6/2001 |
| EP | 1418364 A1 | 5/2004 |
| WO | 2008054533 A2 | 5/2008 |

OTHER PUBLICATIONS

International Search Authority, "Written Opinion," PCT/US2013/044984 mailed Sep. 17, 2013.

*Primary Examiner* — Faye M Fleming
(74) *Attorney, Agent, or Firm* — Jeffrey C. Watson; Balser & Grell IP Law (57) ABSTRACT

An electronically adjustable damper system includes at least one electronically adjustable damper. The electronically adjustable damper includes at least one electronically controlled valve, whereby, the damper is electronically adjustable. The electronically adjustable damper system also includes a controller for adjusting each of the electronically adjustable dampers independently via the electronically controlled valves, and a remote electronic device. The electronically adjustable damper system allows a user to tune the dampers by allowing a user to adjust the electronically adjustable damper system to different applications and functions for various users, conditions, or both.

20 Claims, 10 Drawing Sheets

(56) References Cited

U.S. PATENT DOCUMENTS

| | | |
|---|---|---|
| 5,572,426 A | 11/1996 | Sasaki et al. |
| 5,987,369 A | 11/1999 | Kwak et al. |
| 6,859,702 B2 | 2/2005 | Kawashima et al. |
| 7,131,654 B2 | 11/2006 | Sakai |
| 7,287,760 B1 * | 10/2007 | Quick et al. ............... 280/5.512 |
| 7,526,665 B2 | 4/2009 | Kim et al. |
| 8,090,500 B2 | 1/2012 | Sekiya |
| 2005/0085969 A1 | 4/2005 | Kim |
| 2005/0178628 A1 | 8/2005 | Uchino et al. |
| 2009/0248247 A1 | 10/2009 | Furuichi et al. |
| 2013/0228404 A1 * | 9/2013 | Marking .................... 188/266.2 |
| 2013/0292218 A1 * | 11/2013 | Ericksen et al. ........... 188/266.2 |

* cited by examiner

ELECTRONICALLY ADJUSTABLE DAMPER AND SYSTEM

CROSS-REFERENCE TO RELATED APPLICATIONS

This application claims priority to U.S. Provisional Patent Application Ser. No. 61/682,359, filed Aug. 13, 2012, which is incorporated herein by reference in its entirety and U.S. Provisional Patent Application Ser. No. 61/657,234, filed Jun. 8, 2012, which is also incorporated herein by reference in its entirety.

FIELD OF INVENTION

The instant invention relates to Electronically Adjustable dampers and suspension systems that may allow users to tune the vehicle's dampers or suspension system to the conditions and terrain from the driver's seat or any other remote locations.

BACKGROUND OF THE INVENTION

In the automobile and/or vehicle design industry and in automobile racing (professional and amateur), optimizing the suspension of a vehicle is critical to the vehicle's performance and safety. This may be especially true for the off-road vehicle industry including professional and/or consumer or recreational. However, there are few if any known methods that provide a user friendly interface with remote access to easily adjust the dampers and the performance of the suspension system, such as from the driver's seat or other remote location from the suspension system.

There are typically two types of suspension systems, passive systems and active systems. Passive systems are standard shock systems that are not adjustable, typically with a shock piston moving in oil. Although most passive shocks do not have adjustments, some passive shocks can have adjustable compression, rebound and/or spring preload. The current practice for optimizing passive systems includes, running the vehicle or race car through a plurality of test cycles or trial runs using a variety of different suspension setups which have to be manually adjusted (changing out shocks, manually adjusting the shocks, or revalving the shocks which may include disassembly, reconfiguring shims, pistons, bleed, etc., and reassembling), and then taking the results of those tests to determine the optimal suspension design. The test cycles and trial runs could include many different types of tests, including, laps around a test track or a seven post test, which can be time consuming and expensive. Active or adaptive suspension systems include technology with an onboard computer that detects body movement from sensors throughout the vehicle and, using data calculated by opportune control techniques, controls the action of the suspension. Active suspensions typically use separate actuators which can exert an independent force on the suspension to improve the riding characteristics. The drawbacks of active suspension system designs are high cost, added complication/mass of the apparatus, and the need for rather frequent maintenance on some implementations. In addition, maintenance and adjustment of the system can be problematic, since only a factory-authorized dealer will have the tools and mechanics with knowledge of the system, and some problems can be difficult to diagnose. Semi-active systems can only change the viscous damping coefficient of the shock absorber, and do not add energy to the suspension system. Though limited in their intervention (for example, the control force can never have different direction than the current vector of velocity of the suspension), semi-active suspensions are less expensive to design and consume far less energy.

Although there are adjustable shocks and systems, the known use of adjustable shocks and such adjustable systems, whether active or passive, do not provide a user with the option to adjust their suspension setup easily, if at all. For example, if a driver of a jeep or SUV wants to drive off-road, he might desire to have a certain suspension setup for off-road use and a different set up for his travel to the off-road site on roads. Thus, there is clearly a need for a suspension system that allows a user to easily adjust their damper setup and resulting suspension system. This type of adjustable suspension system may be of interest to persons or entities requiring adjustable variable damping dependant on position of the shock absorber. This relation can be required by, but not limited to, varying load conditions, speed conditions, terrain conditions, weather conditions, and occupant comfort conditions. Such an adjustable suspension system may be useful or required for research and development of vehicle platforms to optimize chassis configurations. Such entities may include, but are not limited to, the following: Racing Teams; Automotive Manufacturers; Motorcycle Manufacturers; Commercial vehicles manned, and or unmanned; Military vehicles manned, and or unmanned; Extraterrestrial vehicles manned, and or unmanned; etc.; and the like.

The instant invention is designed to addresses the above mentioned problems by providing a conveniently, remotely, electronically adjustable damper and system.

SUMMARY OF THE INVENTION

The instant invention is directed toward an electronically adjustable damper and system. The electronically adjustable damper includes at least one electronically controlled valve, whereby, the damper is electronically adjustable. The electronically adjustable damper system includes at least one of the electronically adjustable dampers. The electronically adjustable damper system also includes a controller for adjusting each of the electronically adjustable dampers independently via the electronically controlled valves, and a remote electronic device. The electronically adjustable damper system allows a user to tune the dampers by allowing a user to adjust the electronically adjustable damper system to different applications and functions for various users, conditions, or both.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
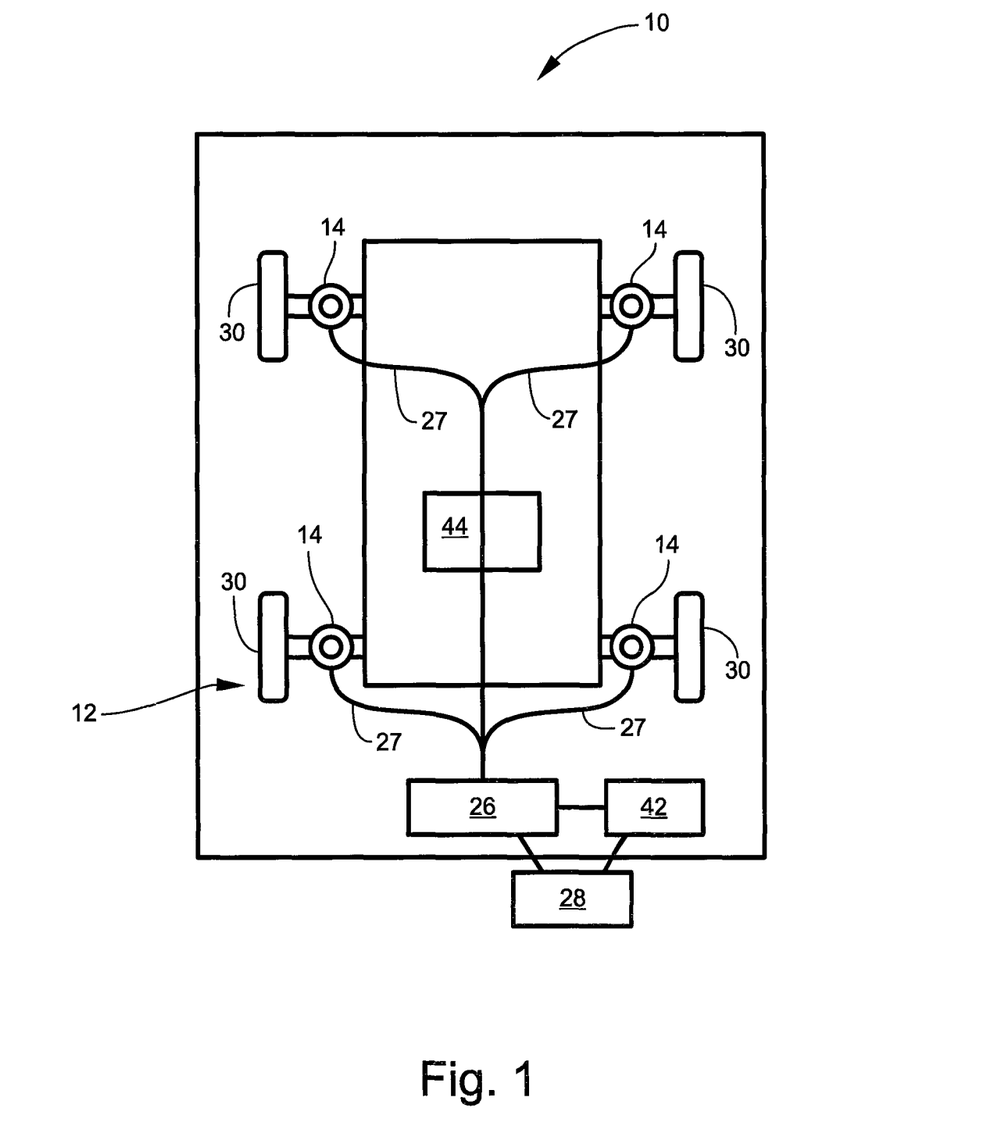
FIG. 1 is a schematic diagram of the electronically adjustable damper system according to at least one embodiment of the instant invention.
Figure 2A:
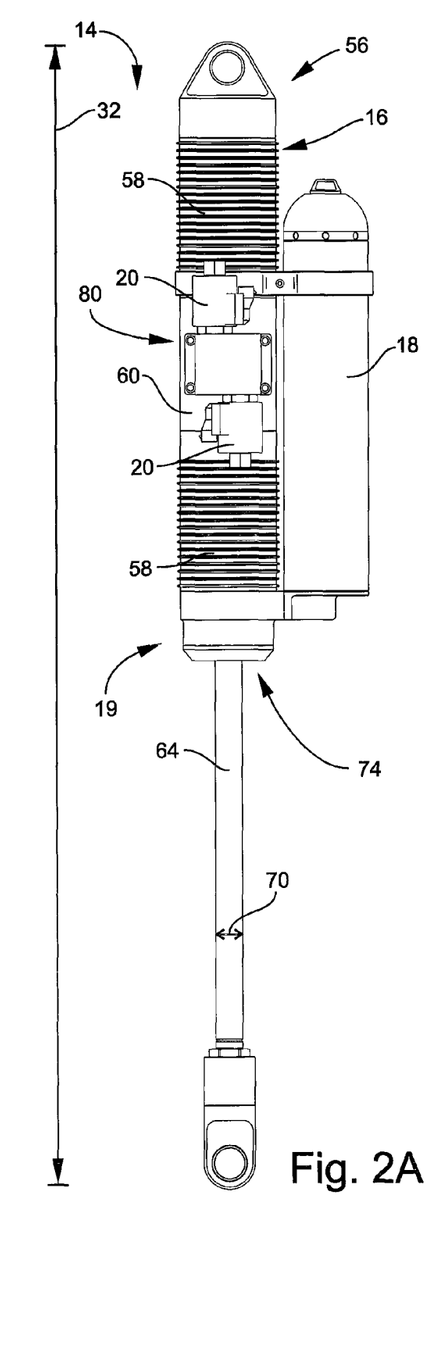
FIG. 2A is a side elevational view of the electronically adjustable damper according to at least one embodiment of the instant invention with a manifold positioned in the middle of the damper.
Figure 2B:
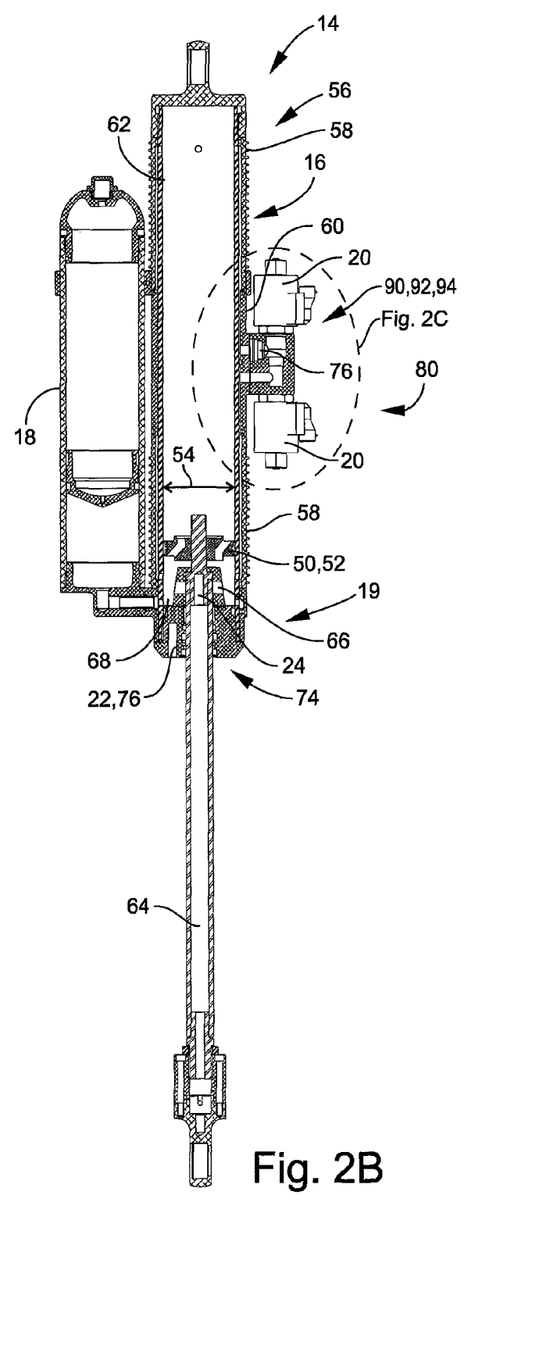
FIG. 2B is a cross-sectional view of the electronically adjustable damper shown in FIG. 2A.
Figure 2C:
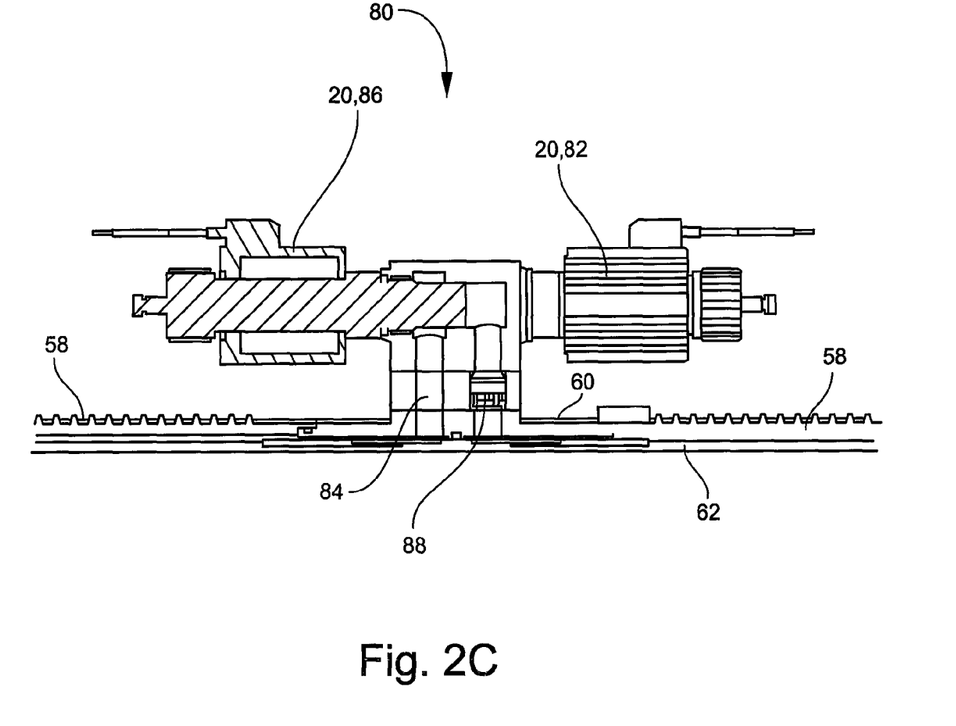
FIG. 2C is a zoomed-in view of the cross-sectional view of the electronically adjustable damper shown in FIG. 2B.

Referring to the drawings, wherein like numerals indicate like elements, there is shown in the Figures an embodiment of an electronically adjustable damper system 10 (see FIG. 1) with an electronically adjustable damper 14 (see FIGS. 2A, 2B, and 2C). The electronically adjustable damper system 10 may be adapted to allow a user to tune the dampers 14 by allowing a user to adjust the electronically adjustable damper system to different applications and functions for various users, conditions, locations, or combinations thereof. The electronically adjustable system 10 may allow the remote adjustment of standard passive automotive dampers by means of a remote electronic device 29 with a wired or wireless connection, for example a cellular, wifi, or Bluetooth connection. This remote connection may allow the typical passive damper to be transformed to a semi-active or even active damper system by remote control, such as through various remote electronic devices 28, like computers, cell phones, laptops, tablets, etc. In one embodiment, an application in the system 10 may be programmed to respond accordingly to various parameters like vehicle parameters/conditions, terrain parameters, acceleration and/or GPS location inputs. This feature of system 10 may be useful for vehicles that have to perform in a wide range of terrain/conditions, or for vehicles on a race track that encounter different types of handling conditions where changes to the damper are necessary either for safety, speed and/or comfort.

The electronically adjustable system 10 could be of particular interest to industries which build and/or test race cars, conventional vehicles, such as passenger vehicles, motorcycles, or development of any type of vehicle requiring a quick method to establish a damping pattern which would allow the vehicle to handle better under specific conditions. Such entities include, but are not limited to: the auto racing industry, the motorcycle industry, the military vehicle industry, the commercial car industry, the commercial truck industry, off-road vehicles, and/or the consumer recreational industry. For example, electronically adjustable system 10 could be used to fine tune damping setups in race cars during competition or testing damping configurations in real world applications without having to stop the vehicle and adjust the damper manually. As should be clearly understood, the use of electronically adjustable system 10 could significantly cut testing times and costs on these types of vehicles.

The present invention is directed toward electronically adjustable ("E-Adjust") dampers 14 and an electronically adjustable system 10 with such dampers. The control function of the E-Adjust dampers 14 and system 10 may allow variable damping at different displacements throughout the dampers compressive and extension strokes. This can relate to terrestrial and closed course conditions. The invention can also be used to harvest data relating to a particular vehicle and conditions in which it operates. The E-Adjust dampers 14 and system 10 can be used in static testing on various test platforms such as 4, 7 and 8 post hydraulic vehicle chassis rigs or servo-hydraulic test rigs.

The electronically adjustable damper system 10 may be for a vehicle 12. Vehicle 12 may be any vehicle, including, but not limited to, bicycles, motorcycles, all-terrain vehicles (ATV, UTV), snowmobiles, automobile, motor homes, bus/coach, the like, etc. Vehicle 12 may have any number of wheels or suspension systems, including, but not limited to, 2 wheels, 4 wheels, or any other wheel and suspension configuration. For example, as shown in FIG. 1, electronically adjustable damper system 10 may be installed on vehicle 12, where it is a standard automobile with 4 wheels.

Electronically adjustable damper system 10 may generally include at least one electronically adjustable damper 14, a controller 26, and a remote electronic device 29. These parts and their respective functions will be described in greater detail below.

Electronically adjustable damper 14 may be included in electronically adjustable damper system 10. See FIGS. 1-2. Electronically adjustable damper 14 may be for providing an electronically adjustable damper for system 10. Damper 14 may be electronically adjustable by any means. In one embodiment, electronically adjustable damper 14 may be electronically adjustable by including at least one electronically controlled valve 20 and a linear velocity displacement transducer (LVDT) sensor 24. In this embodiment, the electronically controlled valve 20 may be manipulated to open and close the bleed path in damper 14 in response to signals provided by the LVDT sensor 24. These two features may allow a user to alter the damping characteristics of damper 14 to a prescribed setting throughout the entire stroke in compression and/or extension based on the position of the damper and changes in damper length 32.

At least one electronically controlled valve 20 may be included in electronically adjustable damper 14. Electronically controlled valves 20 may be any electronically controlled valves. For example, the electronically controlled valves may include, but are not limited to, piezo valves, pressure relief valves, solenoid valves, pressure speed spool valve, electric spool valve, proportional valve, servo controlled valves, direct drive valves, the like, and combinations thereof. In one embodiment, a first electronically controlled valve 20 may be included for the compression flow through main piston cylinder 16, and a second electronically controlled valve 20 may be included for the rebound flow through main piston cylinder 16. However, the invention is not so limited, and any number of electronically controlled valves 20 may be included in damper 14.

The linear velocity displacement sensor 24, or LVDT sensor 24, may optionally be included with the electronically adjustable damper 14. In one embodiment, the LVDT sensor may be integrally built onto or inside electronically adjustable damper 14. See FIG. 2B. However, the invention is not so limited, and the LVDT sensor 24 may be positioned anywhere on, or in, electronically adjustable damper 14. In one embodiment, the integral LVDT sensor 24 may be housed in a shaft 64 and be activated by a magnet 66. In this embodiment, the magnet 66 may be housed in the seal head 68 of shaft 64. This embodiment may allow the stroke or shaft extension to vary infinitely, thereby allowing the electronically adjustable damper 14 to vary damping at infinite different positions in the stroke of the shaft 64. Thus, when the electronically adjustable dampers change their length 32 due to chassis or terrain inputs, the system may utilize the LVDT sensor 24 to determine the damper position and alter the damping to a prescribed setting throughout its entire stroke in compression and extension.

In certain embodiments, a main piston cylinder 16 and an external reservoir 18 may be included in electronically adjustable damper 14 (and 14a). See FIGS. 2A, 2B, 5A, 5B and 5C. Main piston cylinder 16 may house the main piston 50 and the hydraulic movements of damper 14. The main piston 50 may be any standard piston commonly known in the art. The piston 50 may be any size or type, including having any sized piston diameter 54. In one embodiment, the main piston 50 may be a deflective disc style piston 52 for both compression and extension. In another embodiment, all compressive damping force could be via flow through the manifold 80 (see FIG. 2C), with rebound damping being through the deflective disc style piston. In one embodiment, external reservoir 18 may be mounted on the rebound stroke side 19 of the main piston cylinder 16 (as shown in the Figures). In other embodiments, external reservoir 18 may be mounted on the compression stroke side of the main piston cylinder 16. External reservoir 18 may be for adding fluid into main piston cylinder 16 from shaft diameter 70 volume ingestion during the rebound of damper 14, or more for thermal expansion/contraction compensation. External reservoir 18 may be any type or size external reservoir known in the art.

Figure 6A:
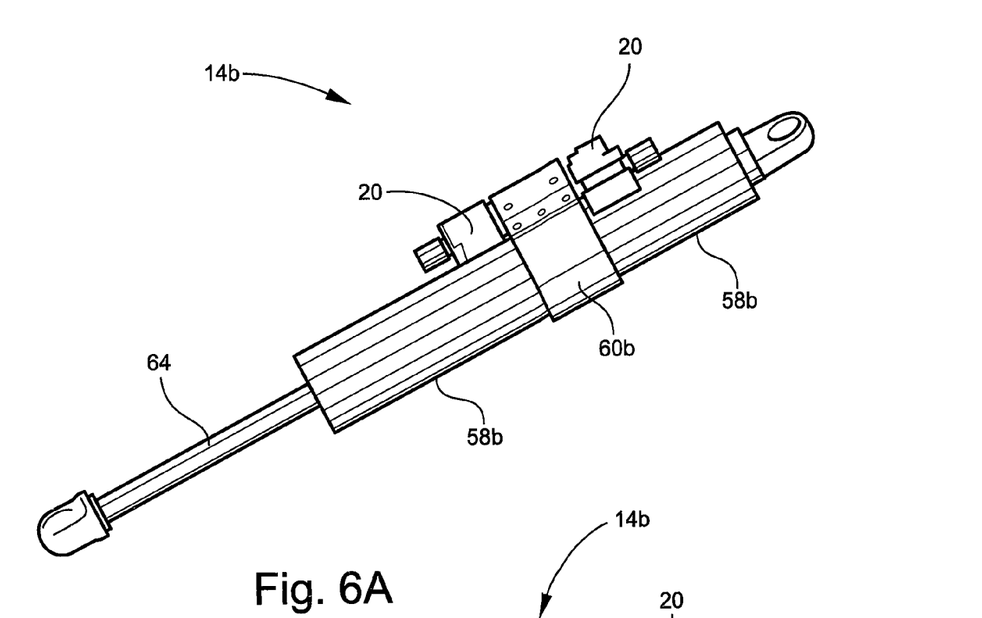
FIG. 6A is a side elevational view of the electronically adjustable damper according to at least one embodiment of the instant invention with an internal reservoir.
Figure 6B:
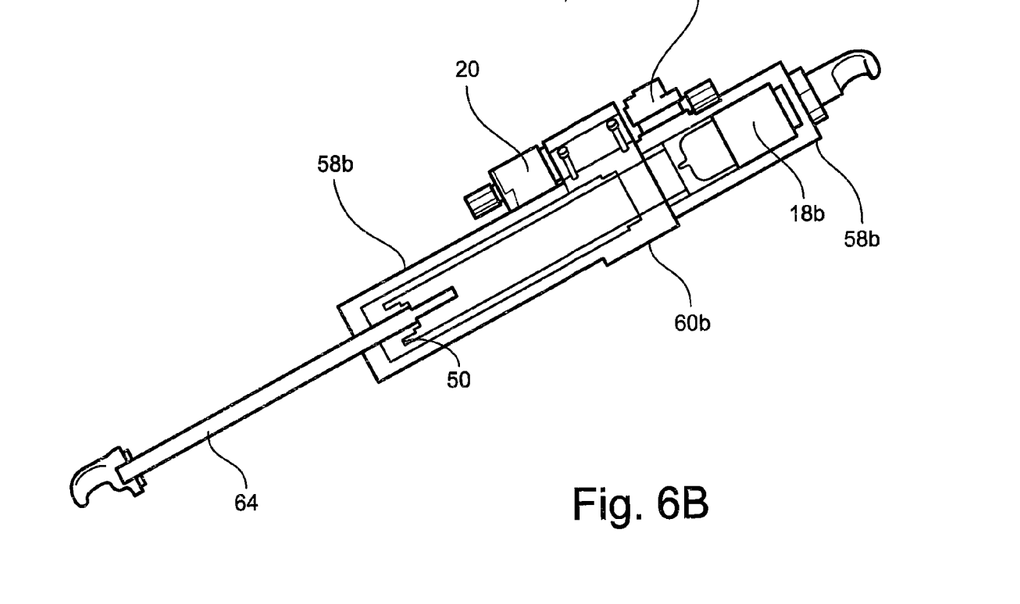
FIG. 6B is a cross-sectional view of the electronically adjustable damper shown in FIG. 6A.

In another embodiment, electronically adjustable damper 14b may house the internal reservoir 18b within the main piston cylinder 16. See FIGS. 6A and 6B. Main piston cylinder 16 may house the main piston 50 and the hydraulic movements of damper 14 in addition to the internal reservoir 18b. The main piston 50 may be any standard piston commonly known in the art. The piston 50 may be any size or type, including having any sized piston diameter 54. In one embodiment, the main piston 50 may be a deflective disc style piston 52 for both compression and extension. Similar to the embodiment shown in FIG. 2C, all compressive damping force could be via flow through the manifold 80 with rebound damping being through the deflective disc style piston. Internal reservoir 18b may be positioned inside main piston cylinder 16. Internal reservoir 18b may be positioned anywhere inside main piston cylinder 16, including inline above or below reservoir tube 62. Internal reservoir 18b may be for adding fluid into main piston cylinder 16 from shaft diameter 70 volume ingestion during the rebound of damper 14b, or more for thermal expansion/contraction compensation. Internal reservoir 18b may be any type or size internal reservoir. Internal reservoir 18b may reduce the need for an external reservoir or tube thereby reducing the size of electronically adjustable damper 14b.

An integrated manifold 80 may be included in electronically adjustable damper 14. Integrated manifold 80 may be for controlling flow through the main piston cylinder 16 in both the rebound and compression directions. Integrated manifold 80 may be built in or "integrated" in the main piston cylinder 16. As such, integrated manifold 80 allows electronically adjustable damper 14 to be electronically adjustable in both compression and rebound without the need of any external tubes. Integrated manifold 80 may control flow in the rebound and compression directions by any means. In one embodiment, integrated manifold 80 may include a compression electronically controlled valve 82 associated with a compression check valve 84 (one way flow in the compression direction). See FIG. 2C. The compression electronically controlled valve 82 in association with the compression check valve 84 may independently control compression flow through main piston cylinder 16. In another embodiment, integrated manifold 80 may include a rebound electronically controlled valve 86 associated with a rebound check valve 88 (one way flow in the rebound direction). See FIG. 2C. The rebound electronically controlled valve 86 in association with the rebound check valve 88 may independently control rebound flow through main piston cylinder 16.

One of the many advantages of manifold 80 is that it may be removable or it may allow its valves and/or coils to be removed, interchanged and/or serviced. Manifold 80 may include serviceable or interchangeable valves, thereby allowing it to be removable. As such, the instant electronically adjustable damper 14 may permit the user to remove the electronically controlled valves and coils and replace them with a "Passive" Compression and Rebound adjuster with application specific flow properties and range of adjustment. Providing a removable manifold 80 with serviceable and interchangeable valves and coils could be desired for many reasons. As a first example, this could be potentially desirable to fit low-flow (in terms of gallons per minute) valves and then control those for fine tuning control at the end of a development program. Early on, a user or suspension designer may fit higher flow control valves, in order to "get in the neighborhood" or the shock tuning that you need. Manifold 80 being removable may also be desired when, as another example, the user is racing in a series that does not allow adjustable shocks. Thus, using system 10 to optimize the suspension, once the user or designer of the suspension system figures out his or her desired damper settings, the user can remove the manifold 80 with the electronically controlled valves 20 thereby making the shock a passive shock. The passive setting desired by the user can correlate to a final setting based on the settings determined using electronically adjustable damper 14 and system 10. As another example, the electronically adjustable damper may permit the user to remove the entire manifold, proportional valves and coils and replace them with a "Fully Active" system using a servo-valve (like a moog valve) used in an active shock system, like the CAS-VP1 system from JRI Development Group, LLC of Mooresville, N.C. disclosed in U.S. Pat. No. 8,056, or any other similar systems.

In one embodiment, four outer sleeves 56 may be included in electronically controlled damper 14. See FIGS. 2A, 2B ad 2C. Four outer sleeves 56 may be for integrating integrated manifold 80 into the middle of main piston cylinder 16. Four outer sleeves may include any devices or configurations for integrating integrated manifold 80 into main piston cylinder 16. In one embodiment, four outer sleeves 56 may include two spacer tubes 58 which may include a finned outer design, a middle manifold tube 60, and a reservoir tube 62. In this embodiment, the electronically controlled compression and rebound valves 82 and 86 may be secured in or on the manifold tube 60, as shown in FIGS. 2B and 2C. The four outer sleeves 56 may be configurable in 360° rotation to allow for free rotation of the damper 14. In one embodiment, the reservoir tube 62 may be compression or extension side fed for shaft diameter 70 volume ingestion via external reservoir 18.

Figures 5A, 5C:
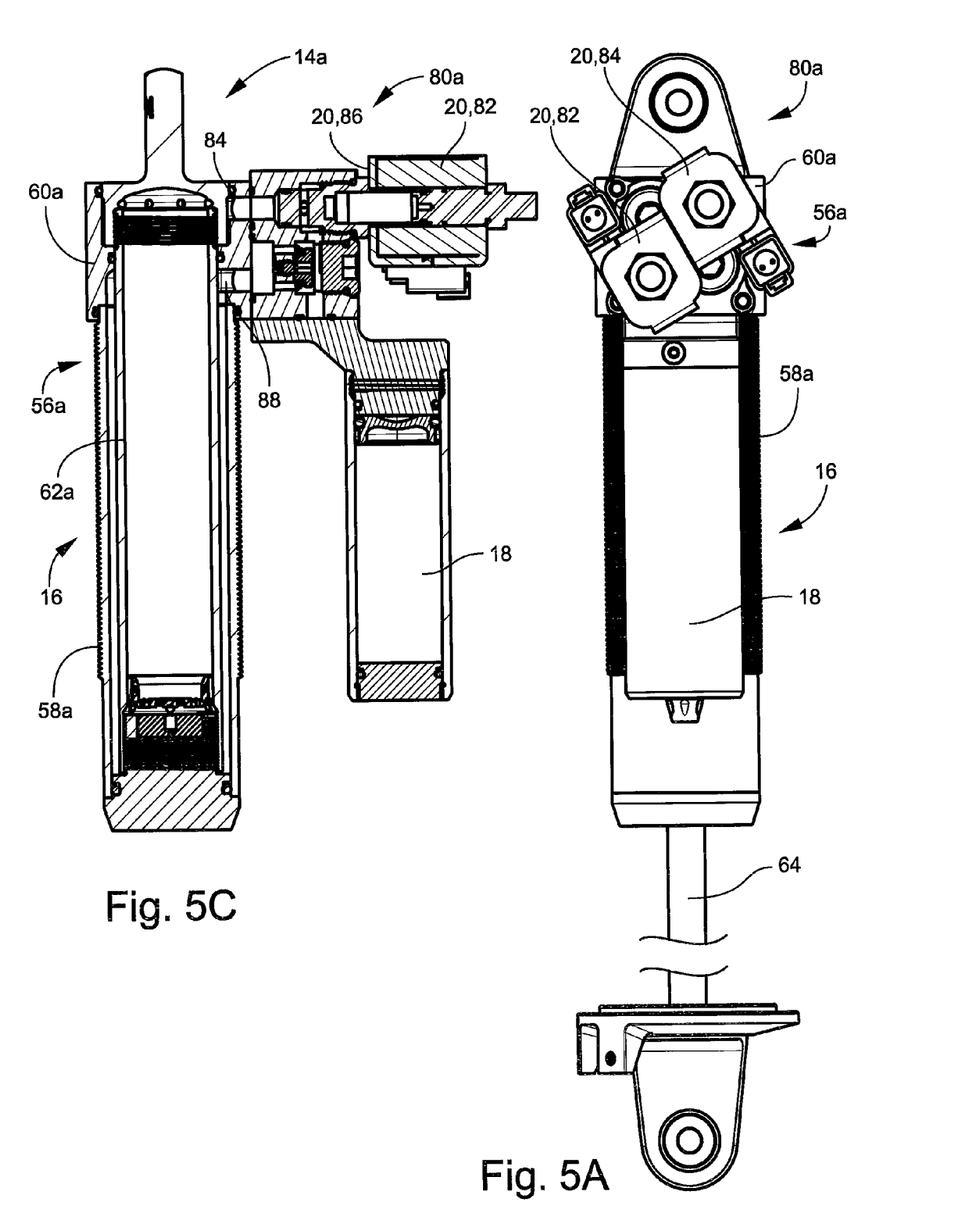
FIG. 5A is a side elevational view of the electronically adjustable damper according to at least one embodiment of the instant invention with a manifold positioned at the top of the shock.
FIG. 5C is another cross-sectional view of the electronically adjustable damper shown in FIG. 5A.
Figure 5B:
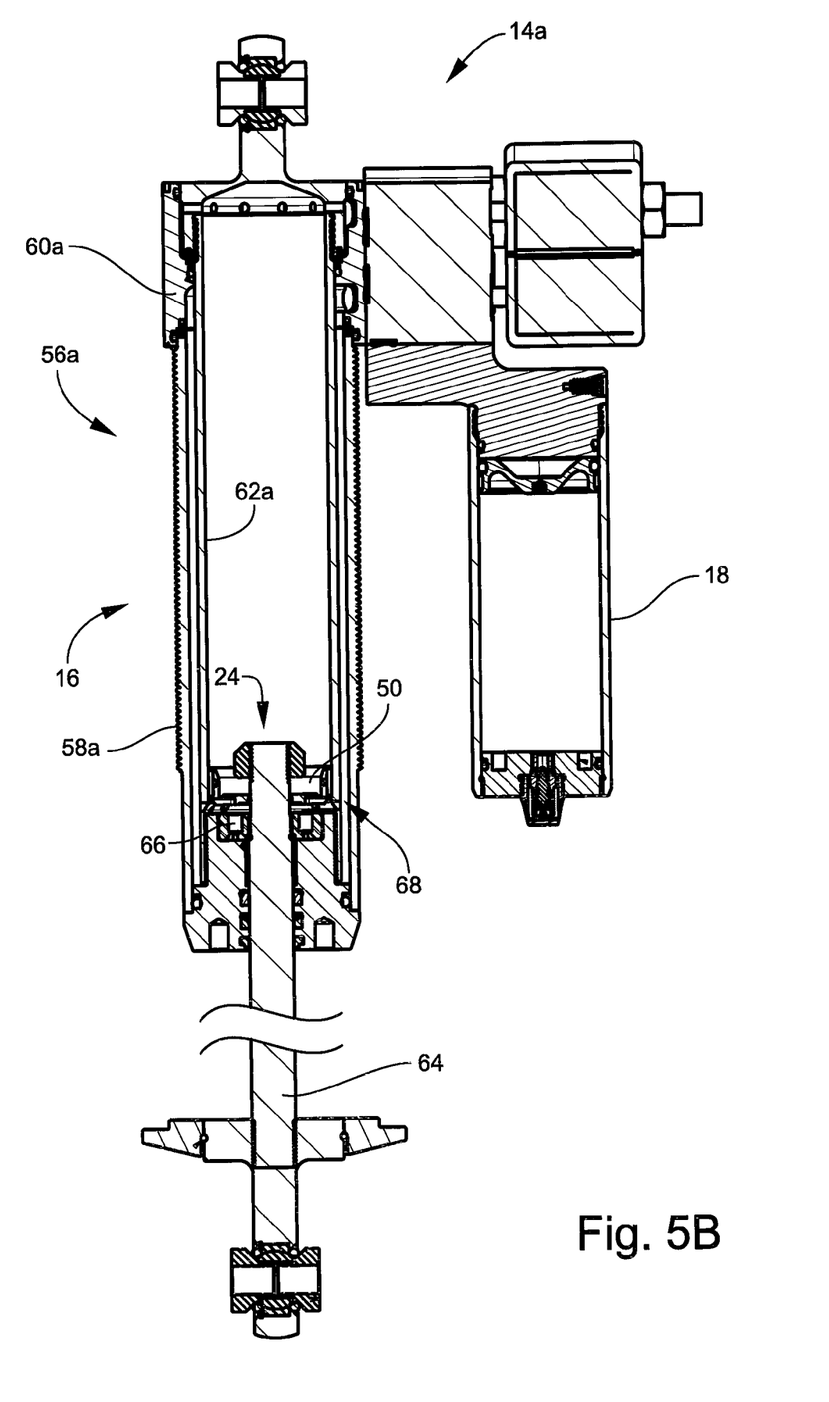
FIG. 5B is a cross-sectional view of the electronically adjustable damper shown in FIG. 5A.

In another embodiment, three outer sleeves 56a may be included in electronically controlled damper 14a. See FIGS. 5A, 5B and 5C. Three outer sleeves may be for integrating integrated manifold 80a into the top (or bottom, not show) of main piston cylinder 16. Three outer sleeves 56a may include any devices or configurations for integrating integrated manifold 80a into the top or bottom of main piston cylinder 16. In one embodiment, three outer sleeves 56a may include a bottom tube 58a which may include a finned outer design, a top manifold tube 60a, and a reservoir tube 62a. In this embodiment, the electronically controlled compression and rebound valves 82 and 86 may be secured in or on the top manifold tube 60, as shown in FIGS. 5A, 5B and 5C. The three outer sleeves 56a may be configurable in 360° rotation to allow for free rotation of the damper 14a. In one embodiment, the reservoir tube 62 may be compression or extension side fed for shaft diameter 70 volume ingestion via external reservoir 18.

A plurality of additional sensors 22 may be included in electronically adjustable damper 14. These plurality of sensors 22 may be in addition to the integral LVDT sensor 24. The additional sensors 22 may be used for any reason, including, but not limited to, harvesting and collecting damper and chassis data. The plurality of additional sensors 22 may be any sensors known or discovered applicable for harvesting and collecting damper and chassis data including, but not limited to, pressure sensors, temperature sensors, quick disconnects, load cells, stroke sensors, linear velocity sensors, acceleration sensors, digital & analog controllers, wiring harnesses, and various combinations thereof. For example, as shown in the embodiment in FIG. 2B, the body cap 74 may include load cell 76 and the manifold tube 60 may accept pressure sensors 90, temperature sensors 92, and quick disconnect sensors 94.

A controller 26 may be included in electronically adjustable system 10. See FIG. 1. Controller 26 may be for adjusting each of the electronically adjustable dampers 14 via the electronically controlled valves 20. In one embodiment, controller 26 may be adapted to adjust each of the dampers 14 independently via each of the electronically controlled valves 20. For example, for the standard 4-wheeled automobile or vehicle 12, controller 26 may control and adjust all four electronically adjustable dampers 14 independently. Controller 26 may be any device or computer capable of controlling the electronically controlled valves 20. Controller 26 may include any desired software or applications for controlling electronically adjustable dampers 14 via their electronically controlled valves 20. Controller 26 may be housed in the vehicle 12 or housed in the remote device 29. If the controller 26 is housed on the vehicle 12, like in FIG. 1, the Controller 26 may communicate with each of the electronically controlled dampers 14 via a plurality of wires 27 or wire harness 27, or also through a wireless protocol (which would require the controller 26 to be wireless). In this embodiment, the remote device 29 could communicate with the controller via any wired or wireless connection. If the controller 26 is housed in remote device 29, then the controller 26 could communicate with each of the electronically controlled dampers 14 via a wired or wireless signal.

The remote electronic device 29 may be included in electronically adjustable damper system 10. See FIGS. 1 and 3A-4. Remote electronic device 29 may be for remotely communicating with the electronically adjustable dampers 14. The remote device 29 may communicate with the controller 26 and/or electronically adjustable dampers 14 by any remote means known or later discovered, including any wired or wireless connection, like a cellular, wifi, ANT+, or Bluetooth connection. Remote electronic device 29 may be any device or system capable of remotely communicating with the electronically adjustable dampers 14.

Figure 3A:
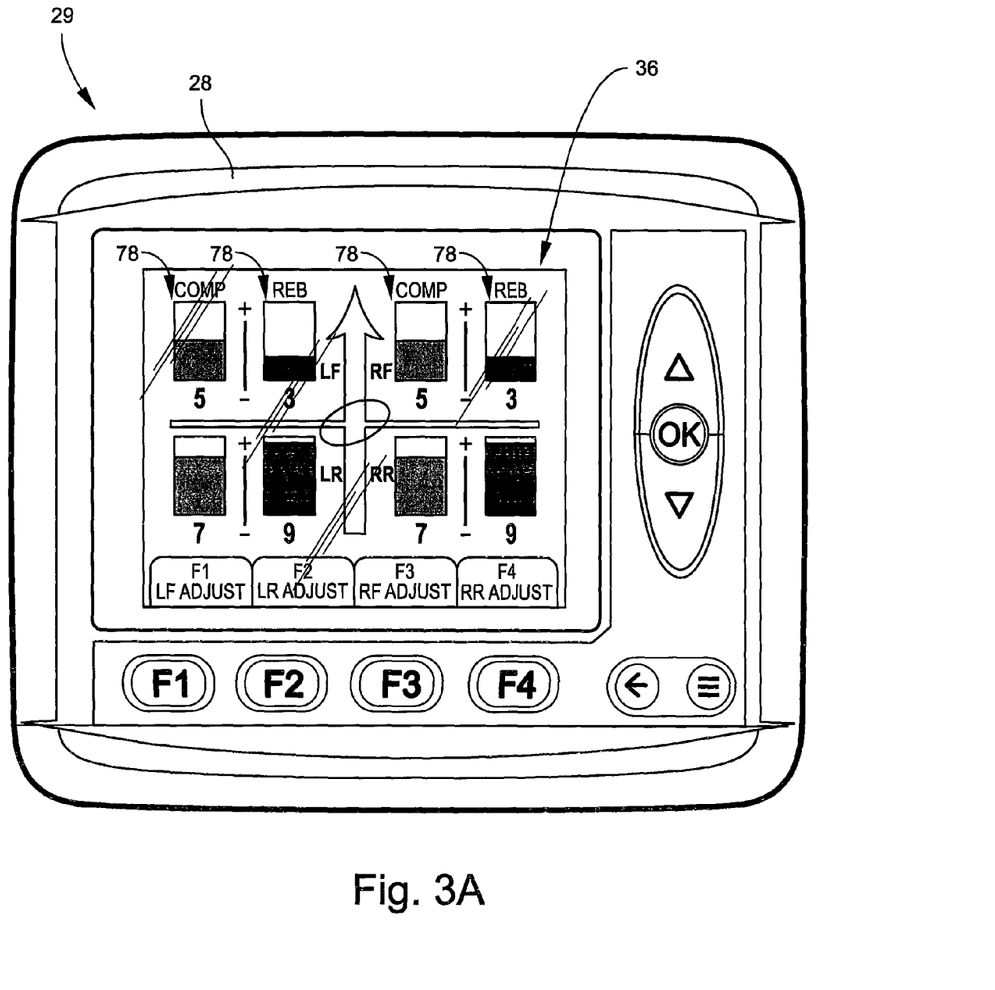
FIG. 3A is a screen shot of the remote electronic device according to one embodiment of the instant invention.
Figure 3B:
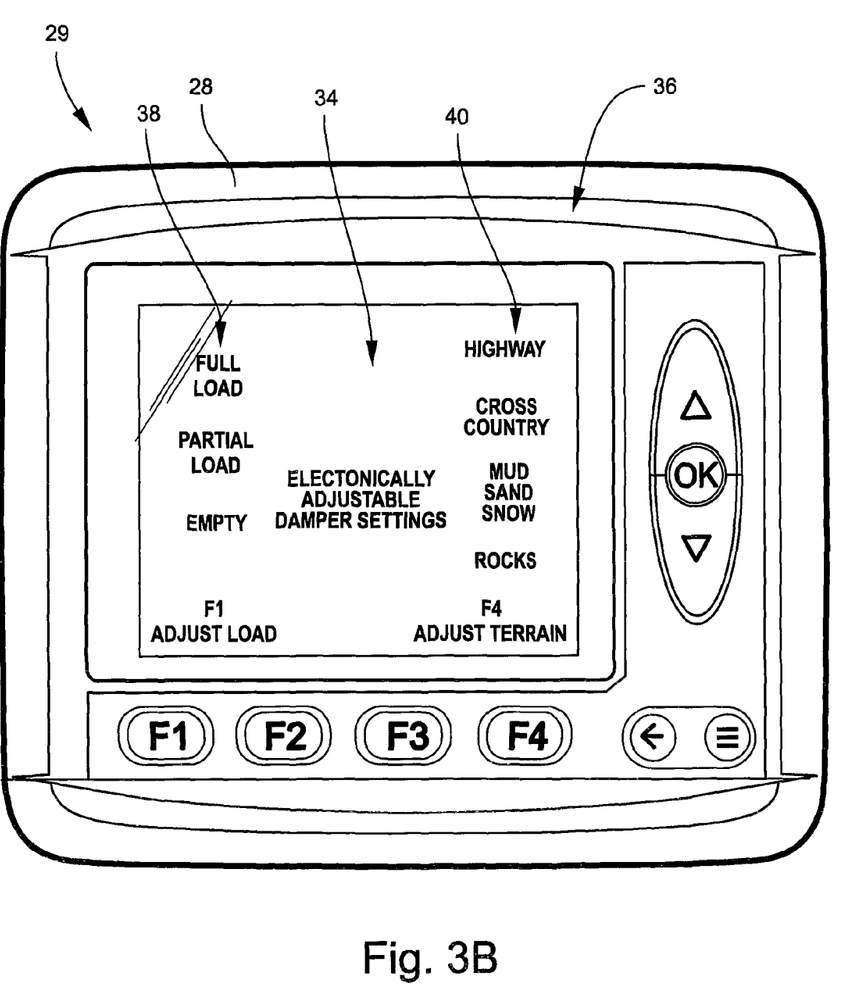
FIG. 3B is another screen shot of the remote electronic device according to another embodiment of the instant invention.
Figure 3C:
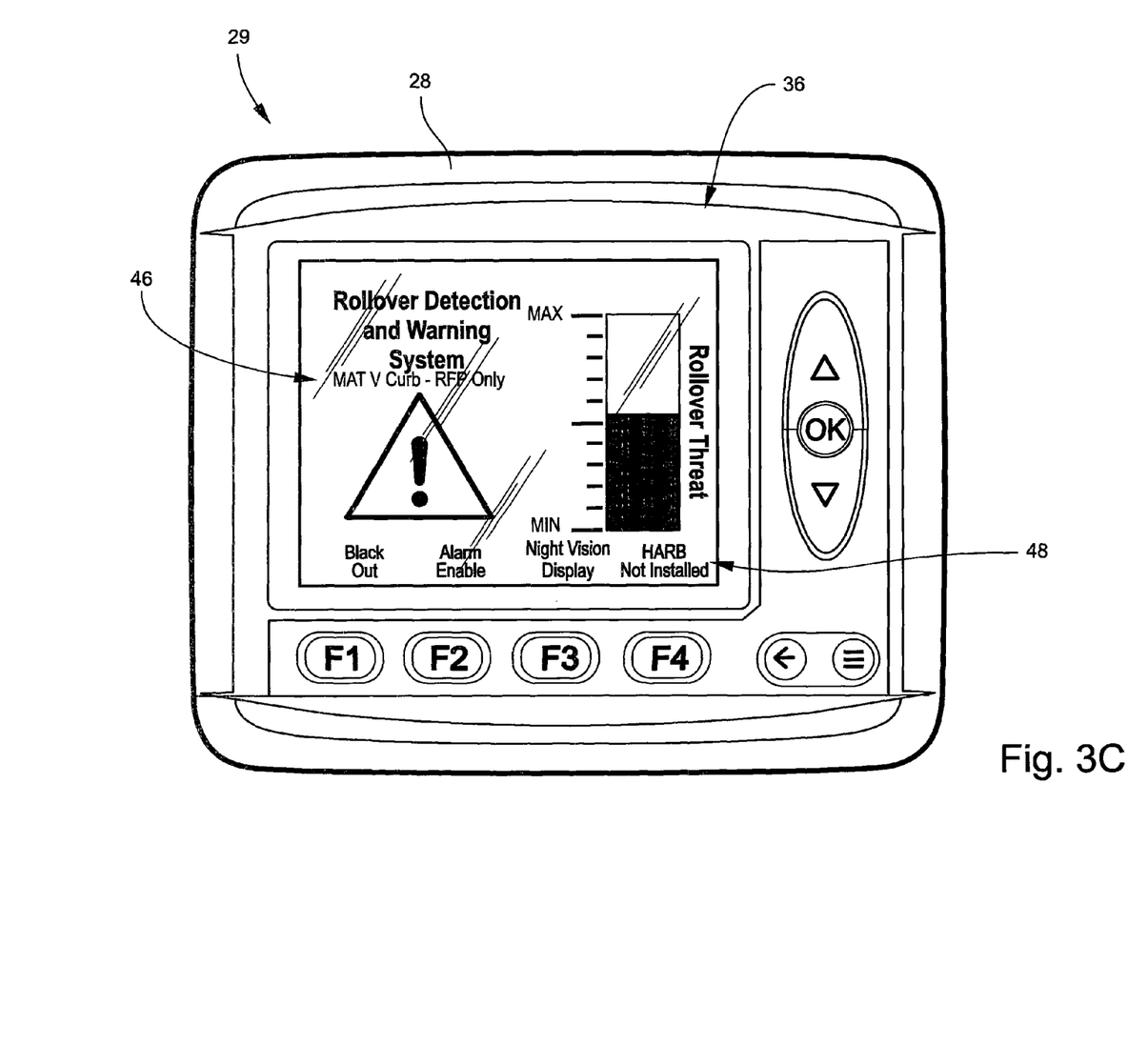
FIG. 3C is yet another screen shot of the remote electronic device according to another embodiment of the instant invention.

Referring to the embodiment shown in FIGS. 3A-3C, remote electronic device 29 may be a visual display unit 28. This visual display unit 28 may be similar to the visual display unit shown in U.S. patent application Ser. No. 13/489,579 entitled A ROLLOVER WARNING SYSTEM FOR A VEHICLE. That application is incorporated herein by reference in its entirety. As shown in FIGS. 1, 7-9 and 11 of U.S. patent application Ser. No. 13/489,579, this type of visual display unit can be installed in any vehicle in any desired location of the driver for easy access, including, on the dash, windshield, console, etc. The visual display unit 28 may include a bracket or plurality of brackets for installation on or in the vehicle. Visual display unit 28 may include a user friendly interface 36 for adjusting system 10. The user friendly interface 36 may be for setting and adjusting each of the electronically adjustable shocks through remote device 29. Referring to FIG. 3A, in one embodiment the user friendly interface 36 may include usual knob and detent positions 78 for adjusting each of the electronically adjustable dampers independently. This embodiment may allow a user to custom set each of the dampers 14 to any desired damping characteristic. Referring to FIG. 3B, in another embodiment the user friendly interface 36 may include prescribed settings 34 for the vehicle 12 that system 10 is installed on. In this embodiment, the electronically adjustable damper system 10 may set the ideal damper prescribed settings 34 using simple vehicle parameters 38 and/or terrain parameters 40, or other desired parameters, The prescribed settings 34 may include any predetermined or calculated settings, including, but not limited to, various vehicle parameters 38 (examples: full load, partial load, empty, ride height lowering, etc.) and/or various terrain parameters 40 (examples: highway, cross country, mud, sand, snow, rocks, etc.) or other desired settings not shown in the Figure like GPS location, time, temperature, etc. In this embodiment, when the electronically adjustable dampers change their length 32 due to chassis or terrain inputs, the controller 26 in conjunction with the LVDT sensor 24 determining its position and altering the damping to a prescribed setting 34 throughout its entire stroke in compression and extension. The prescribed setting 34 may also be looped in macros to offer a user many variations for different conditions.

Figure 4:
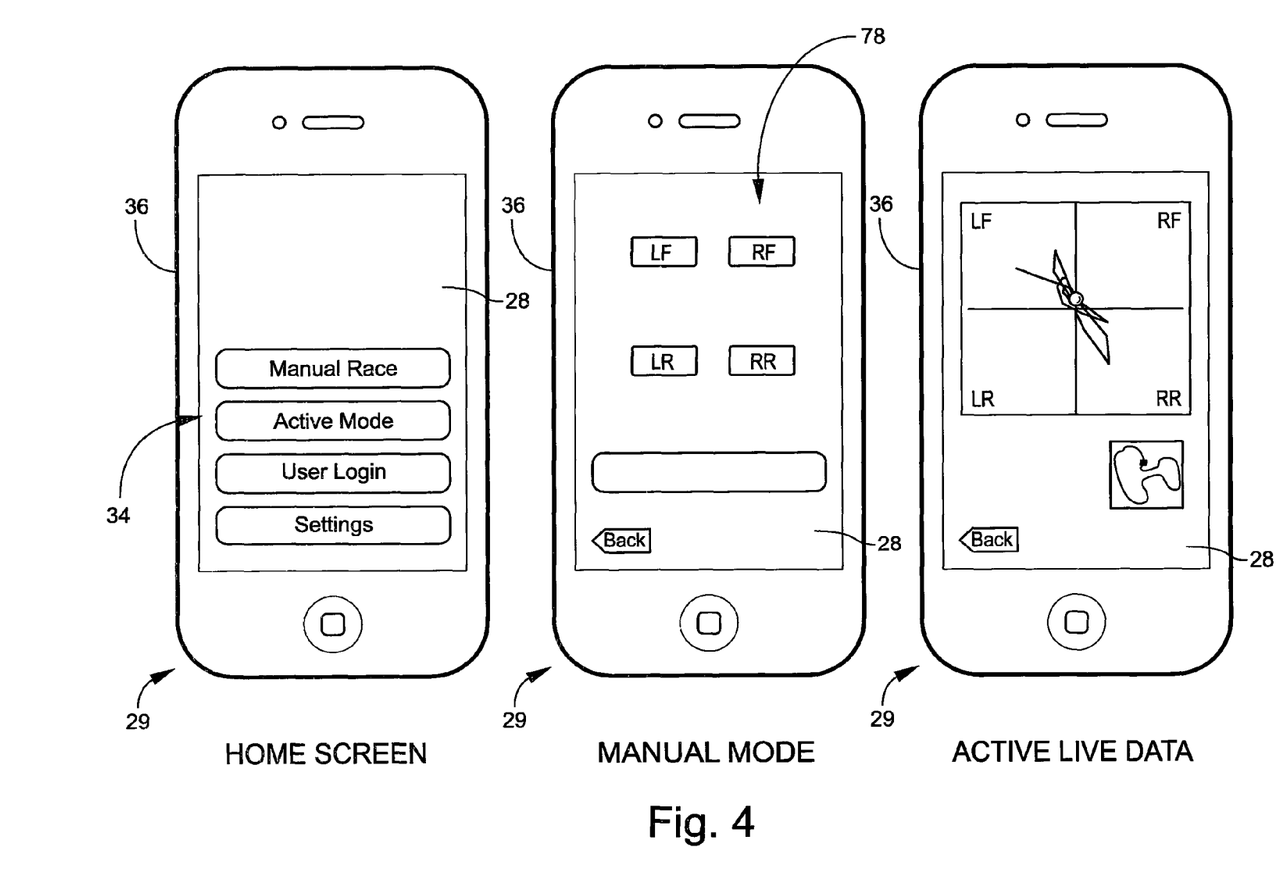
FIG. 4 shows various screen shots of remote electronic device according to another embodiment of the instant invention.

Referring to the embodiment shown in FIG. 4, remote electronic device 29 may be a cell phone or other similar computer or tablet. In this embodiment, the remote electronic device 29 may be carried around by the user and thus required to have a wireless connection to adjustable hydraulic dampers 14, like a cellular, ANT+, wifi or Bluetooth connection. The software or application used to control the cell phone or other similar device may include any desired designs or feature for controlling electronically adjustable damper system 10. As shown in FIG. 4, in one embodiment the user friendly interface may include a home screen, a manual mode and an active live data screen. The home screen may include prescribed settings 34, manual mode (like manual race mode, as shown), active mode etc., a user login tab, a settings tab, and any other desired features programs for controlling system 10. The manual mode may include the usual knob and detent positions 78. The active live mode may show a graph or other visual representation of the LVDT sensor 24 and/or any of the other additional sensors 22. The active live mode may also show a track or other map utilizing the GPS of the phone or other similar computer.

Optionally, the electronically adjustable damper system 10 may further include additional control features. These additional control features may be any hydraulic and/or electronically controlled features present in vehicle 12. In one embodiment, the system 10 may include the control of a computer 42 being adapted for harvesting data relating to a particular vehicle and conditions in which it operates.

In another embodiment, the system 10 may include the control of an Inertial Measurement Unit 44 for incorporating a rollover detection warning system 46. This may include, but is not limited to the RDWS system by MSI Defense Solutions, LLC of Mooresville, N.C. disclosed in U.S. patent application Ser. No. 13/489,579 entitled A ROLLOVER WARNING SYSTEM FOR A VEHICLE, or any other similar systems. The RDWS may be adapted for advising the user of impending dangerous vehicle rollover conditions based on terrain, operation, and vehicle limitations. In one embodiment, the RDWS may include a Roll Risk Estimate and a rollover display incorporated into the visual display unit 28 that may be adapted for providing operators with a visual indication of the roll limits of the vehicle maximizing their ability to use the vehicle to its limits safely. See FIG. 3C. To add the RDWS capabilities to the E-Adjust system of the instant invention only requires the addition of MSI's Inertial Measurement Unit (IMU). The addition of the IMU allows MSI's RDWS to advise the user of impending dangerous vehicle rollover conditions based on terrain, operation, and vehicle limitations, and also allows the capability to adjust the suspension to mitigate a dangerous condition by adjusting the damping force of the vehicle dynamically, if so pre-programmed and enabled. MSI's proprietary Roll Risk Estimate (RRE) operators can adjust the vehicle's condition and remove the vehicle and its occupants from a dangerous situation. A different display, shown in FIG. 3C, provides operators with a visual indication of the roll limits of the vehicle maximizing their ability to use the vehicle to its limits safely.

In another embodiment, the system 10 may control a hydraulic anti-roll bar system 48. See FIG. 3C. This may include, but is not limited to the HARB® system by MSI Defense Solutions, LLC of Mooresville, N.C. disclosed in U.S. Pat. No. 8,167,318 entitled HYDRAULIC ANTI-ROLL SYSTEM, or any other similar systems. U.S. Pat. No. 8,167,318 is incorporated by reference herein in its entirety. The hydraulic anti-roll system may be adapted for allowing vehicles to operate on-road with a stiff roll rate, tunable with air pressure, to optimize performance and stability. MSI's HARB® system replaces traditional mechanical anti-roll bars with a switchable, tunable, hydraulic version. The HARB allows vehicles to operate on-road with a stiff roll rate, tunable with air pressure, to optimize performance and stability. With the push of a button the vehicle adapts to off-road performance, behaving as a vehicle with no roll bar, allowing maximum wheel travel and suspension articulation.

In another embodiment, the system 10 may control a ride height lowering system. This may include any hydraulic system for lowering the ride height of a vehicle, like the hydraulic system for lowering the ride height of a vehicle from MSI Defense Solutions of Mooresville, N.C. disclosed in U.S. patent application Ser. No. 13/280,481 entitled A HYDRAULIC SUSPENSION SYSTEM FOR LOWERING THE RIDE HEIGHT OF A VEHICLE, or any other similar systems. U.S. patent application Ser. No. 13/280,481 is incorporated by reference herein in its entirety. The hydraulic suspension system for lowering the ride height of a vehicle includes at least one hydraulic shock mounted to the suspension of the vehicle. Each of the hydraulic shocks has a floating bearing in the hydraulic shock, and an inlet. The inlet is hydraulically connected to a central manifold that is adapted to move fluid into the hydraulic shock for moving the floating bearing in the hydraulic shock. When the floating bearing is moved in the hydraulic shock, the hydraulic shock shortens thereby lowering the ride height of the vehicle.

In another embodiment, the system 10 may control other various passive systems with electronically controlled valves. This may include any passive systems with electronically controlled valves, like CAS-VP1 system from JRI Development Group, LLC of Mooresville, N.C. disclosed in U.S. Pat. No. 8,056,392 entitled METHOD, SYSTEM, AND DEVICE FOR OPTIMIZING A VEHICLE'S SUSPENSION, or any other similar systems. U.S. Pat. No. 8,056,392 is incorporated by reference herein in its entirety. This method disclosed in U.S. Pat. No. 8,056,392 includes: mounting at least one modified passive shock with a plurality of sensors onto a vehicle, where each mounted shock is adjustable for a plurality of damping forces; connecting each mounted shock to an electronic control unit for adjusting the damping forces of each shock and reading the plurality of sensors; and running the vehicle through a plurality of test cycles, including, reading the plurality of sensors for each shock with the electronic control unit during each test cycle, and adjusting at least one shock to a different damping force between each test cycle with the electronic control unit, where the adjusted shock emulates the damping forces of a standard passive shock.

In other embodiments, the electronically adjustable damper system 10 may include the control of the computer 42, the inertial measurement unit 44, the roll-over detection warning system 46, the hydraulic anti-roll bar 48, the hydraulic suspension system for lowering the ride height of a vehicle, other various passive systems with electronically controlled valves, and various combinations thereof.

The instant invention may also include a method of remotely optimizing the suspension system of a vehicle. This method may generally include installing the electronically adjustable damper system 10 on a vehicle 12 and optimizing the suspension of the vehicle by adjusting at least one of the electronically adjustable dampers 14 via the electronically adjustable damper system 10. The step of installing the system 10 may include any steps for installing dampers 14 on the suspension system of the vehicle and installing the electronics of the system.

In operation, the electronically adjustable dampers 14 of the instant invention, as shown in FIGS. 2A, 2B, and 2C, are designed to vary damping at different positions in the stroke of the shaft. As the shock absorber changes its lengths 32 due to chassis or terrain inputs the controller 26 in conjunction with the LVDT sensor 24 can determine its position and alter the damping to a prescribed setting throughout its entire stroke in compression and extension. These settings can be looped in macros to offer a user many variations for different conditions. The electronically adjustable dampers 14 may be equipped with many different sensors, including, but not limited to, load, stroke, velocity, pressure, temperature, acceleration, etc., the like, and various combinations thereof. These various sensors and combinations of sensors may offer a multitude of input for different configurable closed loop options.

As shown in FIGS. 2A, 2B, and 2C, one embodiment of the electronically adjustable damper 10 includes a 3 inch diameter main piston cylinder 16 utilizing a deflective disc style piston 52 for both compression and extension. There may be four outer sleeves 56 which form a secondary tube. These consist of two finned spacer tubes 58, manifold tube 60, and reservoir tube 62. These are configurable in 360° rotation and the reservoir tube 62 can be compression or extension side fed for shaft diameter 70 volume ingestion. The LVDT sensor 24 may be housed internally in 1⅛ diameter 70 of shaft 64 and may be activated by the magnet 66 housed in the shaft seal head 68. Thus, the stroke or shaft extension can vary infinitely. Two solenoid valves 82 and 86 that may be secured in the manifold tube 60 may be independent with specifically designed one way check valves 84 and 88 for independent flow. In one embodiment, one single controller 26 may adjust the four dampers independently (or any other number of dampers provided on vehicle 12). The manifold tube 60 may be capable of accepting other sensors 22 including but not limited to, pressure, temperature, and quick disconnects. The body cap 74 can include a type of load cell. These additional sensors 22 can be used for altering damping using shock velocity as an input over displacement and to harvest and collect damper and chassis data.

The electronically adjustable damper technology shown in FIGS. 2A, 2B, and 2C may be combined with an electronics package. The Electronically Adjustable ("E-Adjust") system 10 can provide changes in damping capability for vehicles from 400 lbs GVW to 75,000 lbs GVW without sacrificing performance. The E-Adjust system 10 was developed to integrate with a Roll Detection and Warning System (RDWS, see U.S. patent application Ser. No. 13/489,579) and/or a hydraulic Anti-Roll Bar (HARB®, see U.S. Pat. No. 8,167,318). These technologies allow the operator to utilize the vehicle to its maximum capabilities without typical restrictions found in conventional suspension systems.

The user or operator's focal point of the E-Adjust system 10 is the remote electronic device 29 with a visual display unit 28 and a user friendly interface 36. See FIGS. 3-4. The remote electronic device 29 may have flexible programming which may allow the system to be tailored to different applications and functions. For example the E-Adjust system 10 can set damper settings like a traditional adjustable shock with the usual knobs and detent positions 78, as shown in FIG. 3A. In this mode, with advanced shock knowledge and experience, a user can fine tune the dampers to extract maximum performance from the vehicle. For users desiring a simpler interface, the E-Adjust system 10 can set the ideal damper settings using simple vehicle parameters 38 and/or terrain parameters 40 as shown in FIG. 3B (i.e. Highway, Cross Country, etc.).

The electronically adjustable damper system 10 has many advantages. For example, the electronically adjustable system 10 could adapt existing passive damper technology that is readily available. In this embodiment, system 10 could generally include at least one electronic control valve 20, or motor, being mounted to a remote accumulation reservoir which has been outfitted for a low speed compression damping adjuster. The control valve 20 could adapt to the adjuster accordingly and would respond to signals from a remote device 29 in which the operator made an adjustment, or the adjustment was pre-programmed based on a specific acceleration or GPS input to the electronic device.

The electronically adjustable system 10 could also be designed to be outfitted on various types of dampers containing a compression adjuster assembly. The compression adjuster assembly may be a self-contained unit that includes a standard piston and valve stack used to control fluid flow during a high speed bump input on the vehicle's suspension. The shim stack may be preloaded by a spring and can be adjusted manually by the operator. This preload may not be controlled by the electronically adjustable system 10. The center of the piston may have a thru hole to allow fluid to bypass the shim stack in a low speed bump input situation. The fluid flow through the center of the piston may be metered by a tapered screw, which can also be adjusted manually, but with the electronically adjustable system 10 installed, would be controlled by a motor. The motor may be operated remotely by an electronic device containing software specifically designed for electronically adjustable system 10. The signal could be transmitted from the device to the motor via a wired signal, or by a wireless signal, like cellular, Bluetooth and/or wifi. The software could be programmed to operate the motor based on acceleration and/or GPS inputs measured by the device's internal accelerometer and/or GPS capabilities. The operator of the software could make adjustments on-the-fly, during the vehicle or damper's operation without any direct contact with the compression adjuster itself. If the vehicle is on a closed course, the software may have the ability to map the course based on the GPS and acceleration inputs, and the user could adjust the dampers in anticipation of these inputs to make the system more "active". In one embodiment of electronically adjustable system 10, the user of the device may have access to their own personal account which would contain saved damper settings and other proprietary information which may be valuable to the user.

The present invention may be embodied in other forms without departing from the spirit and the essential attributes thereof, and, accordingly, reference should be made to the appended claims, rather than to the foregoing specification, as indicated the scope of the invention.

We claim:

1. An electronically adjustable damper system for a vehicle comprising:
   an electronically adjustable damper for each suspension of the vehicle, each of said electronically adjustable dampers comprising:
     at least one electronically controlled valve; and
     whereby, the damper being electronically adjustable;
   a controller for adjusting each of said electronically adjustable dampers independently via said electronically controlled valves;
   a remote electronic device; and
   a plurality of prescribed settings for the vehicle;
   whereby, said electronically adjustable damper system being configured to allow a user to tune the dampers by allowing a user to select one of the plurality of prescribed settings to adjust the electronically adjustable damper system to different applications and functions for various users, conditions, locations, or combinations thereof.

2. The electronically adjustable damper system of claim 1 wherein, when said electronically adjustable damper changes its lengths due to chassis or terrain inputs, said controller determining its position and altering the damping to a prescribed setting throughout its entire stroke in compression and extension, wherein said prescribed setting being looped in macros to offer a user many variations for different conditions.

3. The electronically adjustable damper system of claim 1 comprising an electronically adjustable damper for each wheel of the vehicle, wherein said controller being for adjusting all of said electronically adjustable dampers independently.

4. The electronically adjustable damper system of claim 3 comprising four electronically adjustable dampers, wherein said controller being for adjusting all four electronically adjustable dampers independently.

5. The electronically adjustable damper system of claim 1 wherein said remote electronic device including a visual display unit with a user friendly interface,
   wherein the electronically adjustable damper system can set the ideal damper settings using simple vehicle and terrain parameters,
   said user friendly interface being for setting damper settings like a traditional adjustable shock where a usual knob and detent position is shown on said visual display unit, where said user may adjust each of said electronically adjustable dampers of the electronically adjustable damper system.

6. The electronically adjustable damper system of claim 1 further comprising additional control features being selected from the group consisting of:
a computer being adapted for harvesting data relating to the vehicle and conditions in which it operates;
an Inertial Measurement Unit for incorporating a rollover detection warning system adapted for advising the user of impending dangerous vehicle rollover conditions based on terrain, operation, and vehicle limitations, said rollover detection warning system including a Roll Risk Estimate and a rollover display adapted for providing operators with a visual indication of the roll limits of the vehicle maximizing their ability to use the vehicle to its limits safely;
a hydraulic anti-roll bar system being adapted for allowing vehicles to operate on-road with a stiff roll rate, tunable with air pressure, to optimize performance and stability; and
combinations thereof.

7. The electronically adjustable damper system of claim 1 wherein said electronically adjustable damper further comprising:
a main piston cylinder;
an external reservoir mounted on the rebound stroke side of said main piston cylinder, or an internal reservoir inside said main piston cylinder;
an integrated manifold controlling flow through the main piston cylinder in both the rebound and compression directions comprising:
a compression electronically controlled valve associated with a compression check valve for controlling compression flow independently; and
a rebound electronically controlled valve associated with a rebound check valve for controlling rebound flow independently;
said main piston cylinder being made of:
four outer sleeves including two finned spacer tubes, a middle manifold tube, and a reservoir tube wherein, said electronically controlled compression and rebound valves being secured in said middle manifold tube, said four outer sleeves being configurable in 360° rotation and the reservoir tube being compression or extension side fed for shaft diameter volume ingestion, or
three outer sleeves including a finned bottom tube, a top manifold tube, and a reservoir tube, wherein, said electronically controlled compression and rebound valves being secured in said top manifold tube, said three outer sleeves being configurable in 360° rotation and the reservoir tube being compression or extension side fed for shaft diameter volume ingestion;
said electronically controlled valves being selected from the group consisting of: piezo valves, pressure relief valves, solenoid valves, pressure speed spool valve, electric spool valve, proportional valve, servo controlled valve, direct drive valve, and combinations thereof;
said electronically adjustable damper not including any external tubes;
said main piston cylinder having a deflective disc style piston for both compression and extension;
an integral linear velocity displacement transducer sensor for altering damping using shock velocity as an input over displacement;
said integral linear velocity displacement transducer sensor being housed in a shaft and being activated by a magnet, wherein said magnet being housed in the seal head of said shaft, whereby the stroke or shaft extension can vary infinitely and said electronically adjustable damper being adapted to vary damping at different positions in the stroke of the shaft;
a plurality of additional sensors to harvest and collect damper and chassis data being selected from the group consisting of: pressure sensors, temperature sensors, quick disconnects, load cells, stroke sensors, linear velocity sensors, acceleration sensors, digital & analog controller, wiring harnesses, and combinations thereof;
a body cap including said load cell; and
said manifold tube accepting said pressure sensors, said temperature sensors, and said quick disconnects sensors.

8. An electronically adjustable damper comprising:
at least one electronically controlled valve; and
a linear velocity displacement transducer sensor for altering damping using shock velocity as an input over displacement;
whereby, the damper being electronically adjustable.

9. The electronically adjustable damper of claim 8 further comprising:
a main piston cylinder;
an external reservoir mounted on the rebound stroke side of said main piston cylinder or an internal reservoir inside said main piston cylinder;
an integrated manifold controlling flow through the main piston cylinder in both the rebound and compression directions.

10. The electronically adjustable damper of claim 9 wherein said integrated manifold comprising:
a compression electronically controlled valve associated with a compression check valve for controlling compression flow independently; and
a rebound electronically controlled valve associated with a rebound check valve for controlling rebound flow independently.

11. The electronically adjustable damper of claim 9 wherein said main piston cylinder being made of:
four outer sleeves including two finned spacer tubes, a middle manifold tube, and a reservoir tube wherein, said electronically controlled compression and rebound valves being secured in said middle manifold tube, or
three outer sleeves including a finned bottom tube, a top manifold tube, and a reservoir tube, wherein, said electronically controlled compression and rebound valves being secured in said top manifold tube.

12. The electronically adjustable damper of claim 11 wherein said four outer sleeves or said three outer sleeves being configurable in 360° rotation and the reservoir tube being compression or extension side fed for shaft diameter volume ingestion.

13. The electronically adjustable damper of claim 8 wherein said electronically controlled valves being selected from the group consisting of: piezo valves, pressure relief valves, solenoid valves, pressure speed spool valve, electric spool valve, proportional valve, servo controlled valve, direct drive valve, and combinations thereof.

14. The electronically adjustable damper of claim 8 wherein said electronically adjustable damper not including any external tubes.

15. The electronically adjustable damper of claim 8 wherein said main piston cylinder having a deflective disc style piston for both compression and extension.

16. The electronically adjustable damper of claim 8 wherein said linear velocity displacement transducer sensor being integrally built into the damper, where said linear velocity displacement transducer being housed in a shaft and being activated by a magnet,
- wherein said magnet being housed in the seal head of said shaft;
- whereby the stroke or shaft extension can vary infinitely and said electronically adjustable damper being adapted to vary damping at different positions in the stroke of the shaft.

17. The electronically adjustable damper of claim 8 further comprising a plurality of additional sensors to harvest and collect damper and chassis data.

18. The electronically adjustable damper of claim 17 wherein said plurality of sensors being selected from the group consisting of: pressure sensors, temperature sensors, quick disconnects, load cells, stroke sensors, linear velocity sensors, acceleration sensors, digital & analog controller, wiring harnesses, and various combinations thereof.

19. The electronically adjustable damper of claim 18 further comprising:
- a body cap including said load cell; and
- said manifold tube accepting said pressure sensors, said temperature sensors, and said quick disconnects sensors.

20. A method of remotely optimizing the suspension system of a vehicle comprising the steps of:
- installing an electronically adjustable damper system on a vehicle;
- said electronically adjustable damper system comprising:
    - an electronically adjustable damper for each suspension of the vehicle, each of said electronically adjustable dampers comprising:
        - at least one electronically controlled valve; and
        - whereby, the damper being electronically adjustable;
    - a controller for adjusting each of said electronically adjustable dampers independently via said electronically controlled valve or valves;
    - a remote electronic device; and
    - a plurality of prescribed settings for the vehicle;
    - whereby, said electronically adjustable damper system being configured to allow a user to select one of the plurality of prescribed settings to fine tune the dampers to extract maximum performance from the vehicle by allowing a user to adjust the electronically adjustable damper system to different applications and functions for various users, conditions, or both; and
- optimizing the suspension of the vehicle by adjusting at least one of said electronically adjustable dampers via said electronically adjustable damper system.

* * * * *